Dec. 6, 1938.                L. S. HUNTER                2,139,409
QUICK DETACHABLE BRAKE LINING
Filed March 14, 1938
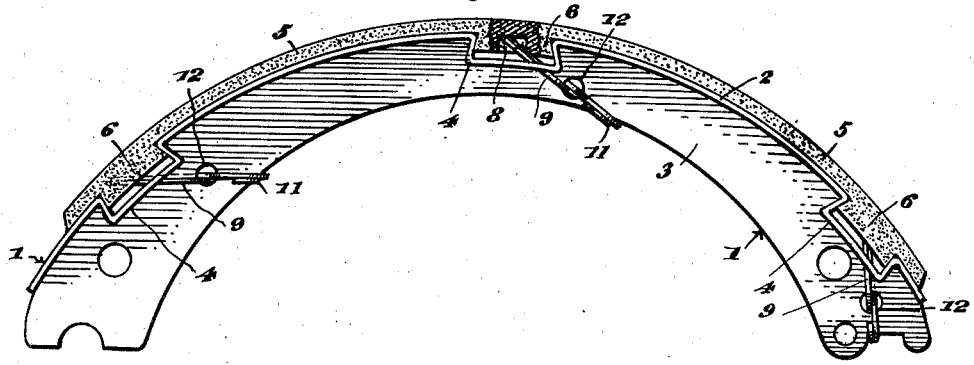
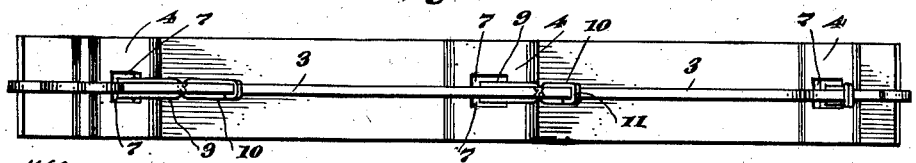
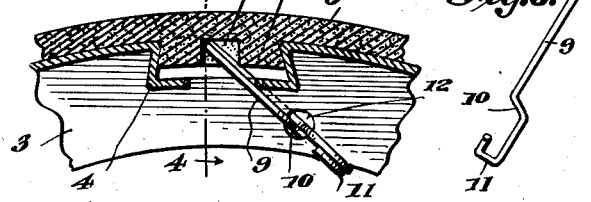 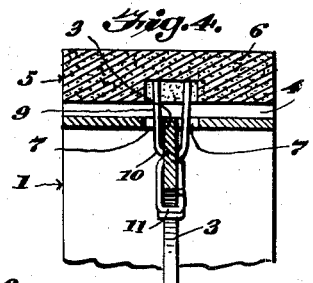
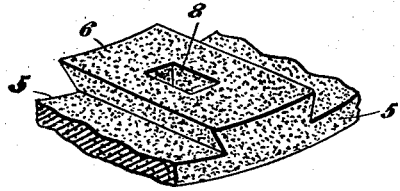 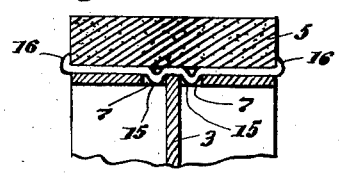
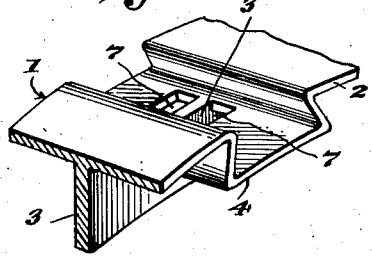 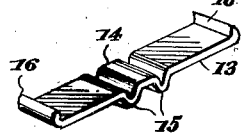
Inventor,
LESTER S. HUNTER.
By E. E. Vrooman & Co.,
Attorneys.

Patented Dec. 6, 1938

2,139,409

UNITED STATES PATENT OFFICE 2,139,409

QUICK DETACHABLE BRAKE LINING

Lester Saxton Hunter, Rochester, N. Y.

Application March 14, 1938, Serial No. 195,913

2 Claims. (Cl. 188—234)

This invention relates to a quick detachable brake lining.

An object of the invention is the construction of a brake shoe and a brake lining with dovetail interlocking means whereby a very simple and efficient fastening means, for the brake lining, is provided, which eliminates auxiliary units, such as pins, etc., for securing the brake lining on the brake shoe against accidental outward removal.

Another object of the invention is the provision of a simple and efficient locking means for preventing accidental lateral displacement of the brake lining off the brake shoe.

A still further object of the invention is the novel construction of a brake shoe with a central flange and with receiving elongated apertures in the body of the brake shoe, at opposite sides of the central flange, whereby novel fastening means is placed in said elongated apertures, and engages the brake lining, for holding said brake lining on the brake shoe against accidental lateral displacement.

With the foregoing and other objects in view, my invention comprises certain novel constructions, combinations and arrangements of parts as will be hereinafter fully described, illustrated in the accompanying drawing, and more particularly pointed out in the appended claims.

In the drawing:

Figure 1 is a view in side elevation, partly shown in section, of an apparatus constructed in accordance with the present invention, while Figure 2 is a bottom plan view of the same.

Figure 3 is an enlarged, fragmentary, longitudinal sectional view of the apparatus.

Figure 4 is a sectional view, taken on line 4—4, Figure 3, and looking in the direction of the arrows.

Figure 5 is a perspective view of one of the sections of each spring locking device.

Figure 6 is a fragmentary, perspective view of the brake lining, shown inverted.

Figure 7 is a fragmentary, perspective view of the brake shoe.

Figure 8 is a transverse sectional view of the brake shoe and brake lining, showing another embodiment of the locking device, while Figure 9 is a perspective view of this locking device.

Referring to the drawing by numerals, in which the preferred embodiment is shown in Figs. 1 to 5, 1 designates the brake shoe, comprising a body 2 with a central, right angle positioned flange 3. The body 2 is provided with a plurality of inwardly-extending transversely positioned dovetail sockets 4. The flexible brake lining 5 is formed of suitable material, to enable it to fit snugly upon body 2, and this brake lining is provided with integral depending dovetail lugs 6. These dovetail lugs 6 fit snugly within the dovetail sockets 4, thereby holding the brake lining on the brake shoe against accidental outward removal. It will therefore be seen that I have discovered a simple combination, in an improved brake shoe and brake lining device, whereby I eliminate any auxiliary means, such as pins, for holding the brake lining on the brake shoe against outward removal. When the operator desires to assemble the brake lining on the brake shoe, he causes the dovetail lugs to register with the dovetail sockets, and then by a sliding movement the brake lining is placed in position on the body 2 of the brake shoe, or vice versa when it is desired to remove the lining from the brake shoe.

In each dovetail socket 4 there are two parallel elongated apertures 7; these apertures are at opposite sides of the central flange 3 (Figs. 4 and 8). Each dovetail lug 6 is provided in its bottom face with a receiving socket 8. This socket 8 registers with the elongated apertures 7. A spring locking device is employed to prevent accidental removal, in a lateral direction, of the brake lining off the brake shoe. This locking device comprises two sections preferably made of spring material, such as spring wire, and each section comprises a body 9 having intermediate its ends an angle portion 10, and a U-shape portion 11 on its outer end. The body 9 is placed through an aperture 12, formed on the central flange 3, near the dovetail socket 4. The U-shape end 11 fits around the outer edge of flange 3 (Fig. 4), with the inner end of the body 9 in the receiving socket 8, thus an efficient spring locking device is provided, at each dovetail socket and dovetail lug, for holding the lining 5 against accidental lateral displacement. The brake lining 5, being of flexible material, will give sufficiently to allow the positioning of the inner ends of the locking devices in the receiving sockets of the dovetail lugs. Further, the positioning of the sections of this spring locking device is preferably done, after the brake lining 4 has been placed upon the brake shoe, which positioning is accomplished by "threading" the bodies 9 through apertures 12, and then springing the hooked or U-shape ends 11 over the edge of flange 3.

In Figures 8 and 9 there is shown another embodiment of the locking device, in which a springy flat piece of metal is employed, and this piece is formed into body 13 provided at its center with a bridge portion 14 and a pair of transversely-positioned depending ribs 15; this bridge 14 and ribs 15 form a W-shape structure for straddling the central flange 3, with the ribs 15 in the elongated apertures 7. There is sufficient room between the dovetail lugs 6 and the bottom of the dovetail sockets 4 to allow forcing of the locking device into position, especially as the brake lining 5 yields, being formed of flexible material. The ends of the body 13 are bent inwardly as at 16, constituting end flanges on the device; these flanges 16 bear against the side edges of the brake lining 5, as clearly seen in Figure 8.

Therefore, it will be seen that in the two embodiments of the locking devices, for positively securing the brake lining for accidental lateral displacement, I have disclosed fastening means in the two elongated apertures of each dovetail socket, engaging the brake lining, for the purpose hereinbefore specified.

From the foregoing description it will also be understood that each set of dovetail lug and dovetail socket is provided preferably with a novel fastening means for locking the brake lining against lateral displacement. In the embodiment shown in the Figures 1 to 4, the fastening means include the apertures 12, in the central flange 3, contiguous to the dovtail sockets 6, Fig. 1.

The end portions of the brake shoe are of any standard construction. The brake shoe being changed, however, in reference to the specific parts hereinbefore described, for the application of my improvement thereto.

While I have described the preferred embodiments of my invention and illustrated the same in the accompanying drawing, certain minor changes or alterations may appear to one skilled in the art to which this invention relates during the extensive manufacture of same, and I, therefore, reserve the right to make such changes or alterations as shall fairly fall within the scope of the appended claims.

What I claim is:

1. In a device of the class described, the combination of a brake shoe provided with sockets, said brake shoe provided with a flange between the ends of said sockets, fastening means in each socket and straddling said flange, a lining on said brake shoe, and said fastening means engaging said lining.

2. In a device of the class described, the combination of a brake shoe comprising a flat body provided with a central flange, said body provided with a plurality of sockets extending across said flange, each socket provided in its bottom with parallel elongated apertures at opposite sides of said flange, said flange provided with a receiving aperture contiguous to each socket, a brake lining on said brake shoe and provided with lugs in said sockets, each lug provided in its inner face with a receiving socket, a spring locking device comprising two sections, each section comprising a body provided intermediate its ends with an angle portion and with a U-shape outer end, said angle portion in said receiving aperture of the flange and the U-shape end around the outer edge of said flange, and the inner end of each section of said locking device positioned in the receiving socket of the lug.

LESTER SAXTON HUNTER.